(12) United States Patent
Nilsson et al.

(10) Patent No.: US 11,398,110 B2
(45) Date of Patent: Jul. 26, 2022

(54) BIOMETRIC IMAGING DEVICE

(71) Applicant: Fingerprint Cards AB, Gothenburg (SE)

(72) Inventors: René Nilsson, Eslöv (SE); Jun Liu, Shanghai (CN); Ehsan Hashemi, Göthenburg (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 17/275,254

(22) PCT Filed: Sep. 17, 2018

(86) PCT No.: PCT/CN2018/105976
§ 371 (c)(1),
(2) Date: Mar. 11, 2021

(87) PCT Pub. No.: WO2020/056547
PCT Pub. Date: Mar. 26, 2020

(65) Prior Publication Data
US 2022/0043998 A1 Feb. 10, 2022

(51) Int. Cl.
*G06V 40/13* (2022.01)
*G06V 40/10* (2022.01)
(52) U.S. Cl.
CPC ........ *G06V 40/1324* (2022.01); *G06V 40/107* (2022.01)
(58) Field of Classification Search
None
See application file for complete search history.

(56) References Cited

U.S. PATENT DOCUMENTS 9,830,009 B2 11/2017 Lee et al.
2004/0169938 A1 9/2004 Nakamura et al.
(Continued)

FOREIGN PATENT DOCUMENTS

CN 106298859 A 1/2017
CN 106845436 A 6/2017
(Continued)

OTHER PUBLICATIONS

PCT International Search Report and Written Opinion dated Jun. 18, 2019 for International Application No. PCT/CN2018/105976, 9 pages.
(Continued)

*Primary Examiner* — Nicholas J Lee
(74) *Attorney, Agent, or Firm* — RMCK Law Group, PLC

(57) ABSTRACT

A biometric imaging device configured to be arranged under an at least partially transparent display panel and configured to capture an image of an object located on an opposite side of the transparent display panel. The biometric imaging device comprises an image sensor comprising a photodetector pixel array; a transparent substrate covering the photodetector pixel array; a first set of microlenses configured to redirect light through the transparent substrate and onto a subarray of pixels in the photodetector pixel array. The lenses in the first set have a first focal length. A second set of microlenses configured to redirect light through the transparent substrate and onto a subarray of pixels in the photodetector pixel array. The lenses in the second set of microlenses have a second focal length which is different from the first focal length.

19 Claims, 5 Drawing Sheets

(56) References Cited

U.S. PATENT DOCUMENTS

| | | | |
|---|---|---|---|
| 2008/0211628 A1* | 9/2008 | Hashimoto | G06K 9/20 340/5.83 |
| 2011/0102886 A1 | 5/2011 | Yamamura | |
| 2013/0250159 A1 | 9/2013 | Nagasaka | |
| 2015/0071648 A1 | 3/2015 | Hong et al. | |
| 2015/0256734 A1 | 9/2015 | Fukuhara | |
| 2016/0239150 A1 | 8/2016 | Lee et al. | |
| 2016/0364600 A1 | 12/2016 | Shah et al. | |
| 2017/0337413 A1 | 11/2017 | Bhat et al. | |
| 2018/0007284 A1 | 1/2018 | Venkataraman et al. | |
| 2018/0336389 A1* | 11/2018 | Wu | G06K 9/0004 |
| 2019/0033976 A1* | 1/2019 | Cao | G06F 1/1686 |

FOREIGN PATENT DOCUMENTS

| | | |
|---|---|---|
| CN | 106959757 A | 7/2017 |
| CN | 107103307 A | 8/2017 |
| CN | 107358216 A | 11/2017 |
| JP | 2010009157 A | 1/2010 |
| WO | 2017066902 A1 | 4/2017 |
| WO | 2018092368 A1 | 5/2018 |

OTHER PUBLICATIONS

Extended European Search Report dated Jul. 29, 2021 for EP Application No. 18934110.0, 5 pages.

\* cited by examiner

BIOMETRIC IMAGING DEVICE

CROSS-REFERENCE TO RELATED APPLICATIONS

This application is a 371 U.S. National Stage of International Application No. PCT/CN2018/105976, filed Sep. 17, 2018. The disclosure of the above application is incorporated herein by reference in its entirety.

FIELD OF THE INVENTION

The present invention relates to a biometric imaging device configured to be arranged under an at least partially transparent display panel. The invention further relates to an electronic device.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

US2015/0071648 describe an optical touch sensing device capable of detecting a fingerprint in a fingerprint sensing mode and to detect touches or gestures in a another mode. The optical touch sensing device operates with two different resolutions by adapting the amount of photoconductive traces and metal traces of the sensing device being actively used. Changes in electrical conductivity of the photoconductive traces are indicative of changes in intensity of the incident light.

However, although the optical touch sensing device disclosed in US2015/0071648 is capable of detecting movements on a display, it would be desirable to be able to detect a wider range of gestures to thereby enable for more complex user control operations via gestures.

Accordingly, it is desirable to provide an improved optical fingerprint sensing device.

SUMMARY

In view of above-mentioned and other drawbacks of the prior art, it is an object of the present invention to provide a biometric imaging device which allows for gesture recognition and fingerprint detection in different focal planes. There is also provided an electronic device comprising such biometric imaging device According to a first aspect of the invention, there is provided a biometric imaging device configured to be arranged under an at least partially transparent display panel and configured to capture an image of an object located on an opposite side of the transparent display panel, the biometric imaging device comprising: an image sensor comprising a photodetector pixel array; a transparent substrate covering the photodetector pixel array; a first set of microlenses wherein each microlens in the first set is configured to redirect light through the transparent substrate and onto a subarray of pixels in the photodetector pixel array, wherein the lenses in the first set of lenses have a first focal length; a second set of microlenses wherein each microlens in the second set is configured to redirect light through the transparent substrate and onto a subarray of pixels in the photodetector pixel array, wherein the lenses in the second set of lenses have a second focal length which is different from the first focal length.

The present invention is based on the realization that two different sets of lenses with different focal lengths may be implemented for detecting objects at different distances from the biometric imaging device. One of the sets of lenses may be adapted for detecting objects such as hand and fingers at a larger distance from another set of lenses. The other set of lenses are instead adapted for detecting e.g. fingers or fingerprints relatively close to the biometric imaging device.

The outer surface of a display panel under which the biometric imaging device is arranged may also be referred to as a sensing surface. The operating principle of the described biometric imaging device is that light emitted by pixels in the display panel will be reflected by a finger placed on the sensing surface, and the reflected light is received by the microlenses and subsequently redirected onto a corresponding subarray of pixels in the photodetector pixel array for each microlens. Thereby an image of a portion of a finger can be captured for each subarray, and by combining the images from all of the microlenses, an image representing the fingerprint or gesture can be formed and subsequent biometric verification can be performed or a gesture recognition.

By means of the claimed invention, a biometric imaging device is provided which is readily integrated in a display panel to provide in-display fingerprint sensing functionality, and where the imaging device is further capable of detecting finger or hand gestures performed in front of the biometric imaging device without necessarily touching the display panel.

Accordingly, the first set of microlenses may be configured for imaging objects touching on outer surface of the transparent display panel, and the second set of microlenses may be configured for imaging objects at a distance away from the outer surface of the transparent display panel.

In embodiments, the second focal length may be longer than the first focal length.

According to embodiments, subarrays of pixels associated with the first set of microlenses are non-overlapping with the subarrays of pixels associated with the second set of microlenses. In order to more easily separate the detected light having been redirected by one of the sets of microlenses from the detected light having been redirected by the other one of the sets of microlenses it is advantageous to configure them with non-overlapping respective subarrays of pixels. Thus, one subarray of pixels which may receive light from a microlens of the first set may at the same time not receive light form a microlens of the other set. The subarrays are in this way distinct from each other. A subarray may have a size in the range of 20 µm to 2 mm.

According to embodiments, the second set of microlenses may be more sparsely distributed that the first set of lenses. Thus, the density of microlenses in the second set may be lower than the density of microlenses in the first set.

According to embodiments, the first set of microlenses and the second set of microlenses may be arranged in a combined array of microlenses. In other words, the first set of microlenses and the second set of microlenses may be arranged mixed in a single array layout.

According to embodiments, the first set of microlenses may be arranged in an array having a pitch in the range of 50 µm to 2 mm.

According to embodiments, the second set of microlenses may be arranged in an array having a pitch which is larger or equal to the pitch for the first set of lenses. The array may be arranged in any pattern, such as a square, rectangular or hexagonal array.

According to embodiments, the lenses in the first set may be circular lenses having a diameter in the range of 20 µm to 1 mm.

According to embodiments, the microlenses in the first set are rectangular lenses having a length of a shortest side in the range of 20 µm to 1 mm.

According to embodiments, the radius of curvature of the lenses in the first set is smaller than the radius of curvature of the lenses in the second set. The radius of curvature may be of the light receiving surface of the microlens, i.e. the surface facing to the display panel. Alternatively, in some embodiments the radius of curvature may be of the surface facing to the image sensor.

Moreover, the microlens may have a height in the range of 2 µm to 600 µm.

With the above described possible configurations of the plurality of microlenses, an optical fingerprint senor for use under a display panel can be provided, and the specific configuration can be adapted based on the properties of the display panel and on the requirements for the application at hand.

According to embodiments, the first set of microlenses may be configured for redirecting light to the photosensitive pixel array for fingerprint detection, and the second set of microlenses may be configured for redirecting light to the photosensitive pixel array for gesture control functions for an electronic device.

According to embodiments, the first set of microlenses and the second set of microlenses are arranged on the transparent substrate arranged to cover the image sensor. This simplifies the manufacturing of the biometric imaging device since the microlenses may all be manufactured on the same transparent substrate. Further, having all the microlenses arranged on a single substrate facility the task of getting the microlenses in a single plane.

The microlenses are preferably configured to focus light onto the respective subarray of pixels.

According to a second aspect of the invention, there is provided an electronic device comprising: a transparent display panel; the biometric imaging device according to any one of the preceding claims, and processing circuitry configured to: receive a signal from the biometric imaging device indicative of a detected object located at a distance from the outer display surface of the transparent display panel, determine a gesture or a shape of the detected object, and perform at least one action based on the detected gesture or shape.

The display panel may for example be based on OLED, LCD, µLED and similar technologies. Thereby, in-display biometric imaging is enabled.

According to embodiments, the processing circuitry may be configured to: receive a signal from the biometric imaging device indicative of a fingerprint of a finger touching the transparent display panel, perform a fingerprint authentication procedure based on the detected fingerprint.

The detected object may be a hand of the user.

The at least one action may comprise navigation events, zooming, volume control, typing, display control, on the electronic device.

The electronic device may be e.g. a mobile device such as a mobile phone (e.g. Smart Phone), a tablet, a phablet, etc.

Further effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the biometric imaging device according to the present invention are mainly described with reference to a biometric imaging device arranged under a display panel. However, it should be noted that the described imaging device also may be used in other optical fingerprint imaging applications such as in an optical fingerprint sensor located under a cover glass or the like.

Figure 1:
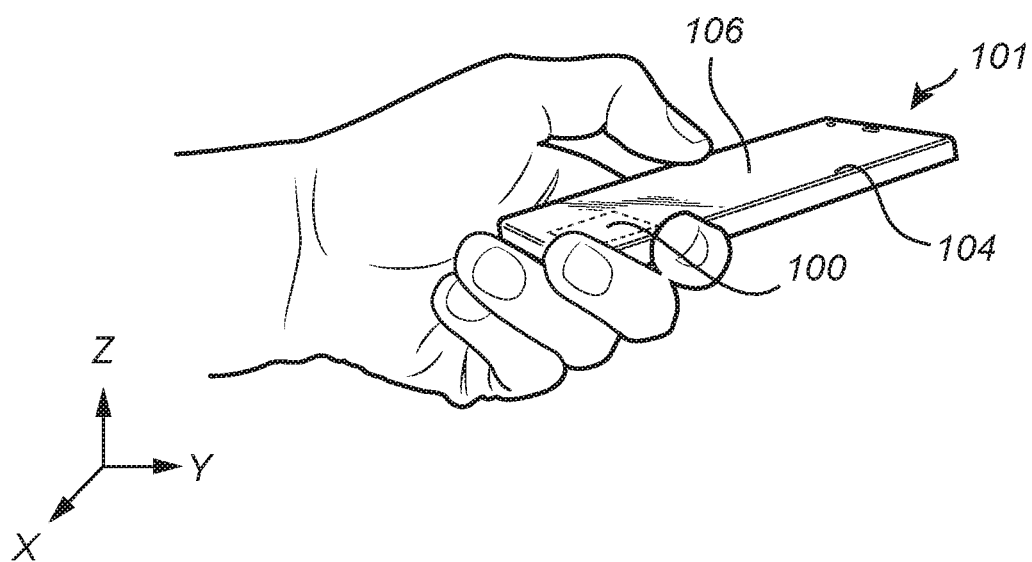
FIG. 1 schematically illustrates an example of an electronic device according to embodiments of the invention.

Turning now to the drawings and in particular to FIG. 1, there is schematically illustrated an example of an electronic device configured to apply the concept according to the present disclosure, in the form of a mobile device 101 with an integrated in-display biometric imaging device 100 and a display panel 104 with a touch screen interface 106. The biometric imaging device 100 may, for example, be used for unlocking the mobile device 100 and/or for authorizing transactions carried out using the mobile device 100, etc. Furthermore, the biometric imaging device 100 may further be used for gesture recognition performed by a user for controlling action on the electronic device.

Preferably and as is apparent for the skilled person, the mobile device 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices comprising transparent display panels, such as a laptop, a tablet computer, etc.

Figure 2:
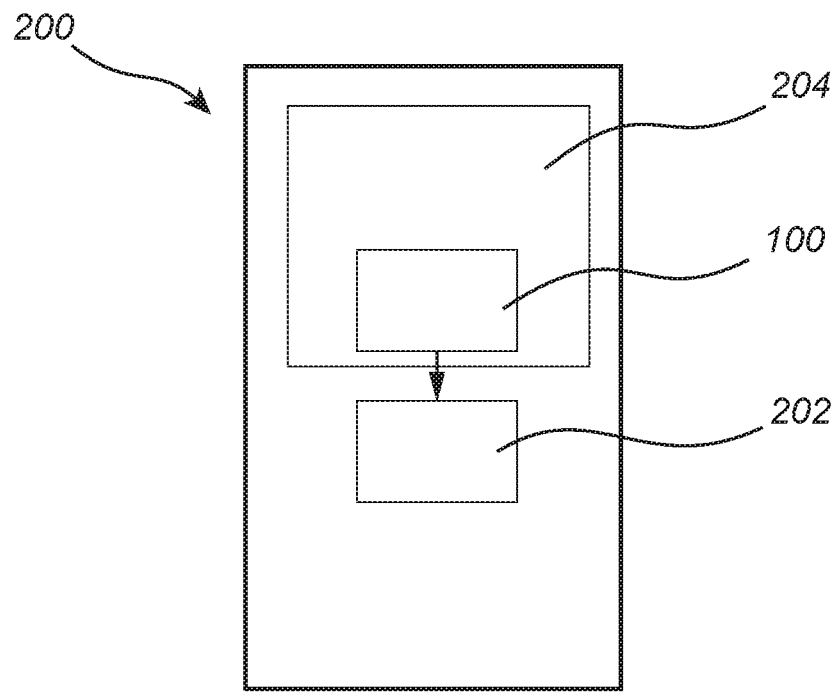
FIG. 2 is a schematic box diagram of an electronic device according to embodiments of the invention.

FIG. 2 is a schematic box diagram of an electronic device according to embodiments of the invention. The electronic device 200 comprises a transparent display panel 204 and a biometric imaging device 100 conceptually illustrated to be arranged under the transparent display panel 204 according to embodiments of the invention. Furthermore, the electronic device 200 comprises processing circuitry such as control unit 202. The control unit 202 may be stand-alone control unit of the electronic device 202, e.g. a device controller. Alternatively, the control unit 202 may be comprised in the biometric imaging device 100.

The control unit 202 is configured to receive a signal indicative of a detected object from the biometric imaging device 100. The received signal may comprise image data. The detected object may be located away from the outer display surface of the transparent display panel 204, i.e. not in contact with the outer display surface.

Based on the received signal the control unit 202 is configured to determine a gesture or a shape of the detected object, or both a gesture and a shape of the detected object. The control unit 202 may utilize image recognition methods which can be considered known, for detecting the shape and/or the gesture of the object.

The control unit 202 is configured to perform at least one action based on the detected gesture and/or shape of the object. Accordingly, the shape and/or gesture performed by the object may be used for controlling functions on the electronic device. The gesture and/or shape of the object may be extracted from the images captured by the biometric imaging device 100. The gesture control of the electronic device may be performed in three dimensions (i.e. x, y, z) for control various functions on the electronic device.

Some example applications which may be controlled by the shape of e.g. a hand, or a gestures performed by a hand or fingers of the hand include: Changing speaker volume (z-direction) or go to the next song (x-y direction), wake up or sleep the display screen using different finger gesture, zoom in or zoom out of a picture or page, scrolling in documents or webpages, display the fingerprint touch location using finger motion floated upon display panel, typing text using finger motion floated upon display panel, change menu with hand waving, etc.

Figure 3:
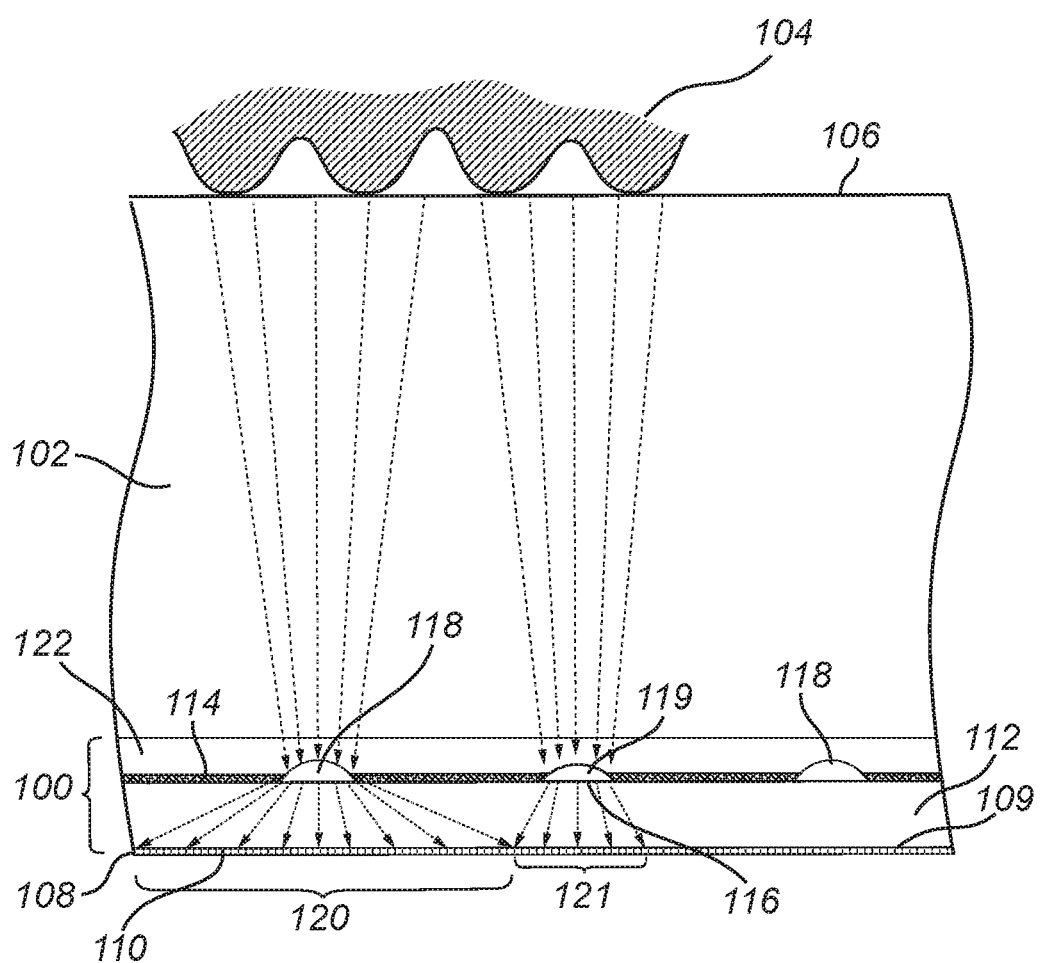
FIG. 3 schematically illustrates a biometric imaging device according to an embodiment of the invention.

FIG. 3 schematically illustrates a biometric imaging device 100 according to an embodiment of the invention. The biometric imaging device 100 is here arranged under an at least partially transparent display panel 102. However, the biometric imaging device 100 may be arranged under any cover structure which is sufficiently transparent, as long as the image sensor receives a sufficient amount of light to capture an image of a biometric object in contact with the outer surface of the cover structure, such as a fingerprint or a palmprint, or to detect an object further away from the outer surface for gesture detection. In the following, a biometric imaging device 100 configured to capture an image of a finger 104 in contact with an outer surface 106 of the display panel 102, and configured to detect a gesture performed by a hand not in contact with the display panel 102, will be described.

The biometric imaging device 100 comprises an image sensor 108 comprising a photodetector pixel array 109, where each pixel 110 is an individually controllable photodetector configured to detect an amount of incoming light and to generate an electric signal indicative of the light received by the detector. The image sensor 108 may be any suitable type of image sensor, such as a CMOS or CCD sensor connected to associated control circuitry. The operation and control of such an image sensor can be assumed to be known and will not be discussed herein.

The biometric imaging device 100 further comprises a transparent substrate 112 arranged to cover the image sensor 108, an opaque layer 114 covering an upper surface of the transparent substrate 112. The opaque layer 114 further comprises a plurality of separate openings 116 arranged at a distance from each other; and two sets of microlenses 118,119 having different focal lengths.

The biometric imaging device comprises two sets of microlenses. Here two lenses 118 in the first set and one lens 119 in the second set are shown. The focal length of the lenses 118 in the first set is different from the focal length of the lens 119 in the second set. Each microlens 118, 119 is arranged in a respective opening 116 of the optional opaque layer 114 in the same plane as the opaque layer 114. Moreover, the microlens 118, 119 has the same size and shape as the opening 116 to prevent any stray light which has not passed through the microlens 118, 119 from reaching the image sensor 108.

Each microlens 118, 119 is configured to redirect light through the transparent substrate 112 and onto a subarray 120, 121 of pixels in the photodetector pixel array 109. The subarrays 120,121 are here defined as arrays of pixels which receives light from only one microlens 118, 119. It should further be noted that the microlenses 118, 119 and display pixels are not drawn to scale. The microlenses 118, 119 is shown to receive light reflected by the finger 104 which has propagated through the display panel 102 before reaching the microlens 118, 119 and the light received by the microlens 118, 119 is focused onto the image sensor 108. The sub-arrays 120 of pixels receiving light from the microlenses 118 of the first set are preferably non-overlapping with the sub-arrays 121 of pixels receiving light from the microlenses 119 of the second set.

The microlenses 118,119 are here illustrated as planoconvex lenses having the flat surface orientated towards the transparent substrate. It is also possible to use other lens configurations and shapes. A plano-convex lens may for example be arranged with the flat surface towards the display panel 102, and in one embodiment the lens may be attached to a bottom surface of the display panel 102 even though the imaging performance may be degraded compared to the reverse orientation of the microlenses. It is also possible to use other types of lenses such as convex lenses. An advantage of using a plano-convex lens is the ease of manufacturing and assembly provided by a lens having a flat surface.

The biometric imaging device 100 further comprises an intermediate layer 122 located between the opaque layer 114 and the display panel 102. The intermediate layer 122 may for example comprise an adhesive layer used to attach the display panel 102 to the imaging device 100, and a refractive index of the intermediate layer 122 is different from a refractive index of the microlens 118, 119. The intermediate layer comprises an air gap between the transparent display panel and the lenses 119, 118. Furthermore, the intermediate layer 122 may also comprise an antireflection coating, an optical filter and/or a polarizing filter, which are not illustrated separately herein. It is in general preferable that the refractive index of the microlens 118,119 is as high as possible and that it is different from the refractive index of any adjacent material above or below the microlens 118.

Figure 4:
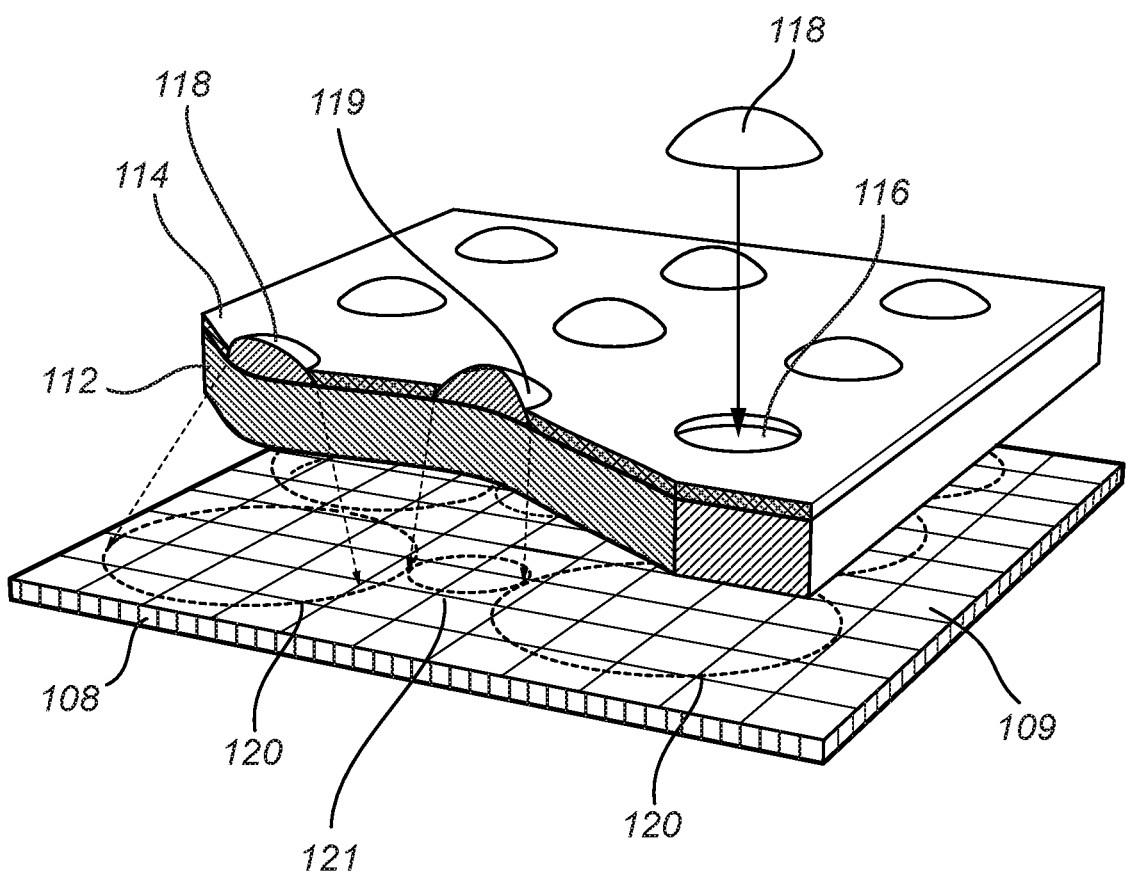
FIG. 4 schematically illustrates a biometric imaging device according to an embodiment of the invention.

FIG. 4 is an exploded view of the biometric imaging device 100 more clearly illustrating the subarrays 120, 121 of pixels in the pixel array 109 receiving light from one microlens 118, 119. The microlenses 118, 119 are here illustrated as circular plano-convex lenses, providing a circular subarray 120, 121 of pixels. It would also be possible to use a rectangular microlens which would lead to an approximately rectangular subarray of pixels. The pitch of the microlenses 118, 119 is at least larger than half of size of the subarray respective 120, 121 or larger than the diameter of the respective microlens 118,119 whichever is the largest. For a circular microlens 118, the diameter of the microlens 118 may be in the range of 20 µm to 1 mm and for a rectangular microlens the length of a shortest side may be in the range of 20 µm to 1 mm. Furthermore, the microlenses 118, 119 have a height in the range of 2 µm to 600 µm and are arranged in a sparse array configuration having a pitch in the range of 50 µm to 2 mm. All of the microlenses 118, 119 within each set of microlenses are preferably of the same size and shape.

In FIG. 4 it can also be seen that the subarrays 120, and or 121 are non-overlapping which is preferable even though it may not be strictly required. Each microlens 118 thus redirects light onto a pixel array 120 comprising a plurality of light sensing elements such that an image is captured by the subarray 120 for the corresponding microlens 118. Similarly, each microlens 119 redirects light onto a pixel array 121 comprising a plurality of light sensing elements such that an image is captured by the subarray 121 for the corresponding microlens 119. Each image represents a portion of the fingerprint or another object, and by combining the captured images a complete image of the finger or the object can be derived and used for further authentication and verification or for gesture control functions. The image analysis required to derive a fingerprint image or to extract a gesture after capturing the plurality of images from the plurality of subarrays can be performed in many different ways and will not be discussed in detail herein.

It can be noted that to capture an image of the fingerprint, only subarrays located directly underneath the finger need to be activated, thereby providing a power efficient and fast image capture. Moreover, the activation of the subarrays can be performed sequentially so that not all subarrays need to be activated all at the same time, thereby enabling the use of simplified readout circuitry.

The biometric imaging device is capable of imaging objects such as fingerprints touching the outer surface of the transparent display panel. Furthermore, the biometric imaging device is also capable of imaging objects located at a distance away from the outer surface of the transparent display panel. This is schematically illustrated in FIG. 5a-b.

Figure 5A:
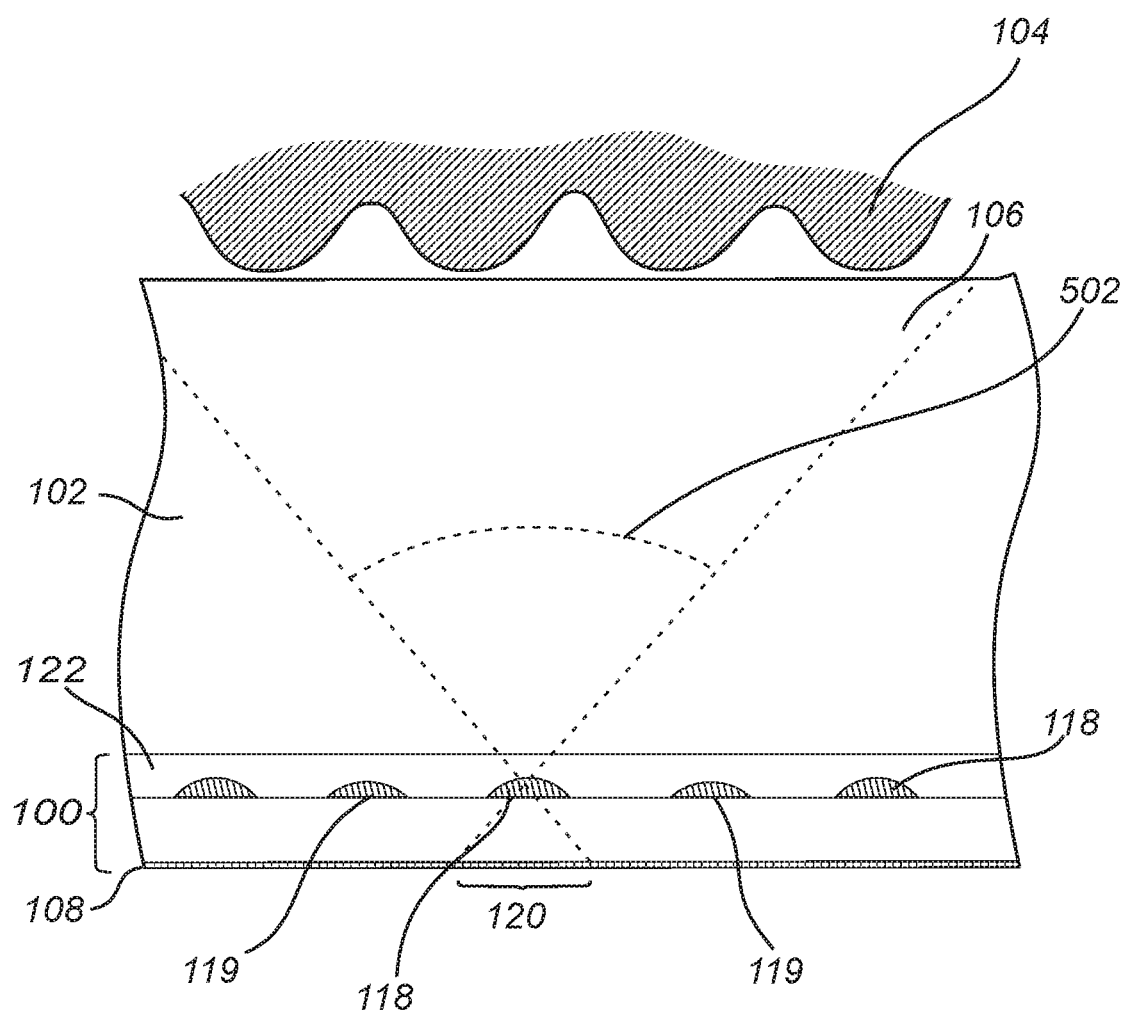
FIG. 5a conceptually illustrates a finger touching the transparent panel and a first set of microlenses which have a first focal length.
Figure 5B:
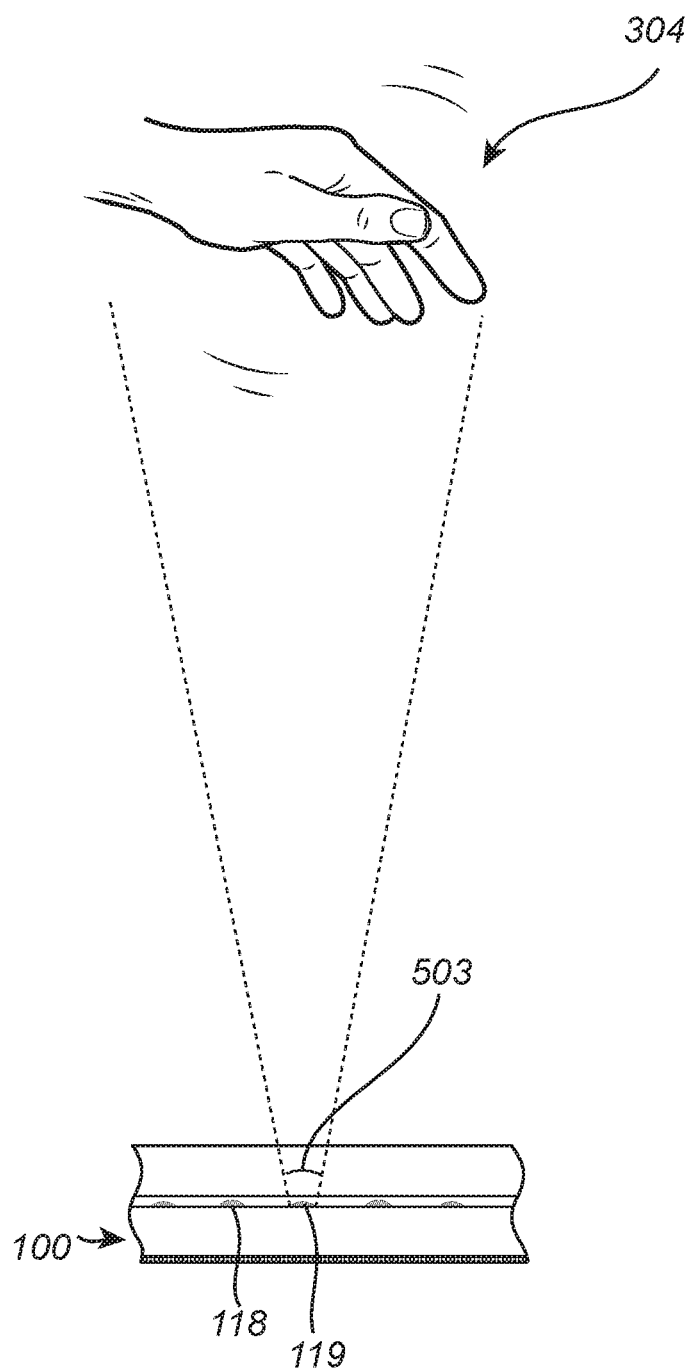
FIG. 5b schematically illustrate an object performing a gesture and a second set of microlenses which have a second focal length.

FIG. 5a schematically illustrates a finger 104 touching the transparent panel 106. FIG. 5b illustrates a hand 304 performing a gesture at a distance away from the outer surface of the transparent display panel.

FIG. 5a conceptually illustrates a finger 104 touching the transparent panel 106 and a first set of lenses 118 which have a first focal length. The first set of lenses have a focal length suitable for focusing light being redirected from the fingerprint of the finger located close to the lenses 118. Accordingly, the first set of lenses 118 are configured to redirect light to the photosensitive pixel array for fingerprint detection.

Furthermore, a second set of lenses are configured to redirecting light to the photosensitive pixel array 108 for gesture control functions. In other words, and as is conceptually illustrated in FIG. 5b, the second set lenses 119 are adapted with a focal length such that e.g. a hand gesture performed by the hand 304 at a relatively large distance from the biometric imaging device 100. The hand 304 and the biometric imaging device 100 are not to scale.

As is common knowledge, the focal length of a lens is closely related to the field of view of the lens. For a given sensor, a shorter focal length also means a wider angular field of view. Thus, the focal length of the first set of lenses 118 which is shorter than the focal length of the second set of lenses 119 results in an angular field of view 502 illustrated in FIG. 5a that is wider than the angular field of view 503 of the second set of lenses 119 illustrated in FIG. 5b. This means that the second set of lenses 119 with the longer focal length are better adapted for imaging of objects further away from the biometric imaging device 100 than the first set of lenses 118. In the same way is the first set of lenses 118 with the shorter focal length better adapted for imaging of objects closer to the biometric imaging device 100 than the second set of lenses 119.

There are various ways to configure lenses to have different focal lengths. One way is to adapt the radius of curvature of the lenses. In one embodiment, the radius of curvature of the lenses 118 in the first set is smaller than the radius of curvature of the lenses 119 in the second set. This is for example the case in the shown embodiment in FIG. 5a.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the biometric imaging device.

Even though the invention has been described with reference to specific exemplifying embodiments thereof, many different alterations, modifications and the like will become apparent for those skilled in the art. Also, it should be noted that parts of the imaging device and method for manufacturing the imaging device may be omitted, interchanged or arranged in various ways, the imaging device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A biometric imaging device configured to be arranged under an at least partially transparent display panel and configured to capture an image of an object located on an opposite side of the transparent display panel, the biometric imaging device comprising:
   an image sensor comprising a photodetector pixel array;
   a transparent substrate covering the photodetector pixel array;
   a first set of microlenses wherein each microlens in the first set is configured to redirect light through the transparent substrate and onto a subarray of pixels in the photodetector pixel array, wherein the lenses in the first set of lenses have a first focal length;

a second set of microlenses wherein each microlens in the second set is configured to redirect light through the transparent substrate and onto a subarray of pixels in the photodetector pixel array, wherein the lenses in the second set of lenses have a second focal length which is different from the first focal length, wherein the first set of microlenses are configured for redirecting light to the photosensitive pixel array for fingerprint detection, and the second set of microlenses are configured for redirecting light to the photosensitive pixel array for gesture control functions for an electronic device.

2. The biometric imaging device according to claim 1, wherein the first set of microlenses are configured for imaging objects touching on the outer surface of the transparent display panel, and the second set of microlenses are configured for imaging objects at a distance away from the outer surface of the transparent display panel.

3. The biometric imaging device according to claim 1, wherein the second focal length is longer than the first focal length.

4. The biometric imaging device according to claim 1, wherein subarrays associated with the first set of microlenses are non-overlapping with the subarrays associated with the second set of microlenses.

5. The biometric imaging device according to claim 1, wherein the second set of microlenses are more sparsely distributed that the first set of lenses.

6. The biometric imaging device according to claim 1, wherein the first set of microlenses and the second set of microlenses are arranged in a combined array of microlenses.

7. The biometric imaging device according to claim 1, wherein the first set of microlenses is arranged in an array having a pitch in the range of 50 μm to 2 mm.

8. The biometric imaging device according to claim 1, wherein the second set of microlenses is arranged in an array having a pitch which is larger or equal to the pitch for the first set of lenses.

9. The biometric imaging device according to claim 1, wherein the lenses in the first set are circular lenses having a diameter in the range of 20 μm to 1 mm.

10. The biometric imaging device according to claim 1, wherein the microlenses in the first set are rectangular lenses having a length of a shortest side in the range of 20 μm to 1 mm.

11. The biometric imaging device according to claim 1, wherein a radius of curvature of the lenses in the first set is smaller than a radius of curvature of the lenses in the second set.

12. The biometric imaging device according to claim 1, wherein the first set of microlenses and the second set of microlenses are arranged on the transparent substrate arranged to cover the image sensor.

13. The biometric imaging device according claim 1, wherein the microlenses are configured to focus light onto the respective subarray of pixels.

14. An electronic device comprising:
a transparent display panel;
the biometric imaging device according to claim 1, and
processing circuitry configured to:
receive a signal from the biometric imaging device indicative of a detected object located at a distance from the outer display surface of the transparent display panel,
determine a gesture or a shape of the detected object, and
perform at least one action based on the detected gesture or shape.

15. The electronic device according to claim 14, wherein the processing circuitry is configured to:
receive a signal from the biometric imaging device indicative of a fingerprint of a finger touching the transparent display panel,
perform a fingerprint authentication procedure based on the detected fingerprint.

16. The electronic device according to claim 14, wherein the detected object is a hand of the user.

17. The electronic device according to claim 14, wherein the at least one action comprises navigation events, zooming, volume control, typing, display control, on the electronic device.

18. The electronic device according to claim 14, wherein the electronic device is a mobile device.

19. Processing circuitry configured to:
receive a signal from a biometric imaging device biometric imaging device according to claim 1, the signal being indicative of a detected object located at a distance from the outer display surface of the transparent display panel,
determine a gesture or a shape of the detected object, and
perform at least one action based on the detected gesture or shape.

* * * * *